(12) United States Patent
Lee et al.

(10) Patent No.: US 10,138,988 B2
(45) Date of Patent: *Nov. 27, 2018

(54) HYDROKINETIC TORQUE COUPLING DEVICE HAVING TURBINE-PISTON LOCKUP CLUTCH, AND RELATED METHODS

(71) Applicant: Valeo Embrayages, Amiens (FR)

(72) Inventors: Sungchul Lee, Troy, MI (US); Zane Yang, Troy, MI (US)

(73) Assignee: Valeo Embrayages, Amiens (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/610,927

(22) Filed: Jun. 1, 2017

(65) Prior Publication Data

US 2017/0268650 A1     Sep. 21, 2017

Related U.S. Application Data

(63) Continuation of application No. PCT/EP2015/076889, filed on Nov. 17, 2015, which
(Continued)

(51) Int. Cl.
*F16H 45/02*     (2006.01)

(52) U.S. Cl.
CPC ..... *F16H 45/02* (2013.01); *F16H 2045/0205* (2013.01); *F16H 2045/0226* (2013.01);
(Continued)

(58) Field of Classification Search
CPC ............ F16H 45/02; F16H 2045/0205; F16H 2045/0221; F16H 2045/0226; F16H 2045/0263; F16H 2045/0284
See application file for complete search history.

(56) References Cited

U.S. PATENT DOCUMENTS

| 2,130,895 A | 9/1938 | Ness |
| 2,860,747 A | 11/1958 | Kelley |

(Continued)

FOREIGN PATENT DOCUMENTS

| DE | 1550957 A1 | 7/1969 |
| DE | 2245901 A1 | 4/1974 |

(Continued)

OTHER PUBLICATIONS

Lindemann et al., "iTC—Innovative Solutions for Torque Converters Pave the Way into the Future", Torque Converter 20, pp. 280-301.

(Continued)

*Primary Examiner* — Richard M Lorence
(74) *Attorney, Agent, or Firm* — Berenato & White, LLC

(57) ABSTRACT

A hydrokinetic torque coupling device features an impeller, a casing having a first engagement surface, a damper assembly, a turbine-piston including a drive component with a second engagement surface, and a clutch plate having clutch plate engagement surfaces interposed between and axially movable relative to at least one of the first and second clutch plate engagement surfaces. The turbine-piston is axially displaceable relative to the casing to move the second engagement surface axially towards and away from the first engagement surface for positioning the hydrokinetic torque coupling device into and out of a lockup mode in which the first and second engagement surfaces and the clutch plate engagement surfaces frictionally interlock with one another to non-rotatably lock the casing relative to the input part of the damper assembly.

18 Claims, 5 Drawing Sheets

Related U.S. Application Data is a continuation of application No. 14/562,216, filed on Dec. 5, 2014, now Pat. No. 9,574,649.

(52) U.S. Cl.
CPC .............. *F16H 2045/0263* (2013.01); *F16H 2045/0284* (2013.01)

(56) References Cited

U.S. PATENT DOCUMENTS

| | | | |
|---|---|---|---|
| 2,903,912 A | 9/1959 | Edsall | |
| 2,992,713 A | 7/1961 | Stump et al. | |
| 3,041,892 A | 7/1962 | Schjolin | |
| 3,126,079 A | 3/1964 | Howard | |
| 3,252,352 A | 5/1966 | General et al. | |
| 4,041,701 A | 8/1977 | Goto et al. | |
| 5,713,442 A | 2/1998 | Murata et al. | |
| 5,813,505 A | 9/1998 | Olsen et al. | |
| 6,026,940 A | 2/2000 | Sudau | |
| 6,915,886 B2 | 7/2005 | Dacho et al. | |
| 7,191,879 B2 | 3/2007 | Arhab et al. | |
| 7,445,099 B2 | 11/2008 | Maucher et al. | |
| 7,837,018 B2 | 11/2010 | Nakamura | |
| 8,161,739 B2 | 4/2012 | Degler | |
| 8,276,723 B2 | 10/2012 | Verhoog et al. | |
| 8,479,901 B2 | 7/2013 | Engelmann | |
| 9,297,448 B1 | 3/2016 | Depraete | |
| 9,341,250 B1 | 5/2016 | Depraete | |
| 9,441,718 B2 | 9/2016 | Depraete | |
| 9,528,586 B2 | 12/2016 | Depraete | |
| 9,541,181 B2 | 1/2017 | Depraete | |
| 9,562,597 B2 | 2/2017 | Depraete | |
| 9,562,598 B2 | 2/2017 | Depraete | |
| 9,574,649 B2 * | 2/2017 | Lee ................. F16H 45/02 | |
| 9,593,755 B2 | 3/2017 | Depraete | |
| 9,599,206 B2 | 3/2017 | Depraete | |
| 2003/0168298 A1 | 9/2003 | Holler et al. | |
| 2003/0168299 A1 | 9/2003 | Holler et al. | |
| 2004/0011032 A1 | 1/2004 | Holler et al. | |
| 2006/0086584 A1 | 4/2006 | Maucher et al. | |
| 2012/0080281 A1 | 4/2012 | Takikawa | |
| 2013/0230385 A1 | 9/2013 | Lindemann et al. | |
| 2014/0014454 A1 | 1/2014 | Davis | |
| 2014/0014455 A1 | 1/2014 | Davis | |
| 2014/0097055 A1 | 4/2014 | Lindemann et al. | |
| 2014/0110207 A1 | 4/2014 | Davis | |
| 2015/0152951 A1 | 6/2015 | Rentfrow | |
| 2015/0362041 A1 | 12/2015 | Lee et al. | |
| 2016/0102746 A1 | 4/2016 | Depraete | |
| 2016/0116038 A1 | 4/2016 | Depraete | |
| 2016/0116040 A1 | 4/2016 | Werthman | |
| 2016/0116041 A1 | 4/2016 | Depraete | |
| 2016/0160971 A1 | 6/2016 | Depraete | |
| 2016/0160975 A1 | 6/2016 | Lee | |
| 2016/0245384 A1 | 8/2016 | Frary | |
| 2016/0305525 A1 | 10/2016 | Depraete | |

FOREIGN PATENT DOCUMENTS

| | | |
|---|---|---|
| DE | 19920542 A1 | 11/1999 |
| DE | 10226860 A1 | 12/2003 |
| DE | 102010033552 A1 | 2/2012 |
| EP | 0125428 A1 | 11/1984 |
| EP | 1744074 | 1/2007 |
| EP | 2149727 A1 | 2/2010 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2736982 A1 | 1/1997 |
| FR | 2787854 A1 | 6/2000 |
| GB | 460838 A | 1/1937 |
| GB | 598811 | 2/1948 |
| JP | 58-131466 A | 8/1983 |
| JP | 2004332801 A | 11/2004 |
| JP | 2006200607 A | 8/2006 |
| KR | 101311531 B1 | 9/2013 |
| WO | WO2004018897 | 3/2004 |
| WO | 2004046574 A1 | 6/2004 |
| WO | WO2011110310 A2 | 9/2011 |
| WO | WO2012043677 A1 | 4/2012 |

OTHER PUBLICATIONS

ISR of corresponding PCT/EP2015/076889 , Apr. 19, 2016.
Written Opinion of corresponding PCT/EP2015/076889, dated Apr. 19, 2016.

* cited by examiner

HYDROKINETIC TORQUE COUPLING DEVICE HAVING TURBINE-PISTON LOCKUP CLUTCH, AND RELATED METHODS

CROSS-REFERENCE TO RELATED APPLICATIONS AND CLAIM TO PRIORITY

This application is a by-pass continuation of International Patent Application No. PCT/EP2015/076889, filed Nov. 17, 2015, which is a continuation of U.S. patent application Ser. No. 14/562,216, filed Dec. 5, 2014, now U.S. Pat. No. 9,574,649, the disclosures of which are incorporated herein by reference and to which priority is claimed.

BACKGROUND OF THE INVENTION

1. Field of the Invention

The present invention generally relates to hydrokinetic torque coupling devices, and more particularly to a hydrokinetic torque coupling device including a turbine-piston lockup clutch for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lockup clutches and their operation are described in, for example, U.S. Pat. No. 8,276,723 and U.S. Pat. No. 7,191,879.

While hydrokinetic torque coupling devices with lockup clutches have proven to be useful for vehicular driveline applications and conditions, improvements that may enhance their performance and cost are possible.

As taught hereinbelow, such improvements may derive from, for example, reducing the spatial requirements of components of the hydrokinetic torque coupling device and/or con

BRIEF SUMMARY OF THE INVENTION

According to a first aspect of the invention, there is provided a hydrokinetic torque coupling device for coupling together a driving shaft and a driven shaft. The hydrokinetic torque coupling device of this first aspect comprises an impeller including an impeller shell, a casing having a first engagement surface and including a casing shell connected to the impeller shell, an axially displaceable turbine-piston hydrodynamically drivable by the impeller, a damper assembly comprising an input part drivenly interconnected to the turbine-piston and an output part operatively connectable to an output hub, and a clutch plate having opposite clutch plate engagement surfaces. The turbine-piston includes a turbine-piston shell and a drive component having a second engagement surface. The clutch plate is interposed between and axially movable relative to at least one of the first and second engagement surfaces. The turbine-piston is axially displaceable relative to the casing to move the second engagement surface axially towards and away from the first engagement surface for positioning the hydrokinetic torque coupling device into and out of a lockup mode in which the first and second engagement surfaces and the clutch plate engagement surfaces frictionally interlock with one another so that the casing is mechanically locked to and non-rotatable relative to the input part of the damper assembly.

A second aspect of the invention provides a method of assembling a hydrokinetic torque coupling device. A torque converter is provided that comprises an impeller including an impeller shell, and an axially displaceable turbine-piston including a turbine-piston shell and a drive component. The torque converter is operatively connected to a casing shell, a damper assembly including an input part drivenly interconnected to the turbine-piston and an output part operatively connectable to an output hub, and a clutch plate having opposite clutch plate engagement surfaces to assemble the hydrokinetic torque coupling device, which includes a casing including the casing shell. The clutch plate is interposed between and axially displaceable relative to at least one of a first engagement surface of the casing and a second engagement surface of the drive component. Turbine-piston is axially displaceable relative to the casing to move the second engagement surface axially towards and away from the first engagement surface for positioning the hydrokinetic torque coupling device into and out of a lockup mode in which the first and second engagement surfaces and the clutch plate engagement surfaces frictionally interlock with one another so that the casing is mechanically locked to and non-rotatable relative to the input part of the damper assembly.

A third aspect of the invention provides a method of operating a hydrokinetic torque coupling device. The hydrokinetic torque coupling device comprises an impeller including an impeller shell, a casing having a first engagement surface and including a casing shell connected to the impeller shell, an axially displaceable turbine-piston hydrodynamically drivable by the impeller and including a turbine-piston shell and a drive component having a second engagement surface, a damper assembly including an input part drivenly interconnected to the turbine-piston and an output part operatively connectable to an output hub, and a clutch plate having opposite clutch plate engagement surfaces interposed between and axially movable relative to at least one of the first and second engagement surfaces. The method comprises axially displacing the turbine-piston relative to the casing to move the second engagement surface axially towards and away from the first engagement surface for positioning the hydrokinetic torque coupling device into and out of a lockup mode in which the first and second engagement surfaces and the clutch plate engagement surfaces frictionally interlock with one another so that the casing is mechanically locked to and non-rotatable relative to the input part of the damper assembly.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

DETAILED DESCRIPTION OF EXEMPLARY EMBODIMENT(S) AND EMBODIED

Method(s) of the Invention

Figure 1:
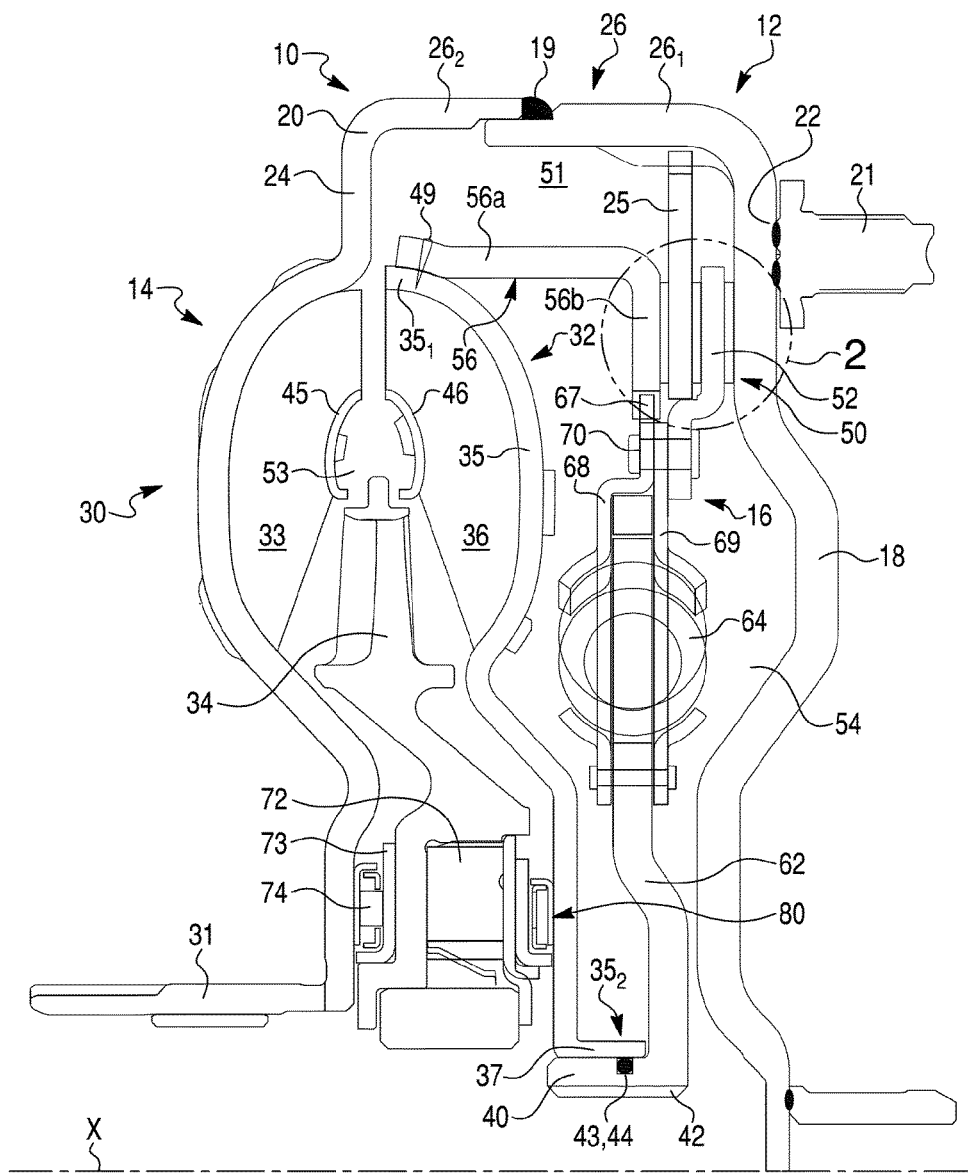
FIG. 1 is a fragmented half-view in axial cross section of a hydrokinetic torque coupling device equipped with a turbine-piston in accordance with a first exemplary embodiment of the present invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

An exemplary embodiment of a hydrokinetic torque coupling device is generally represented in the accompanying drawings by reference numeral 10, as best shown in the fragmentary sectional view in FIG. 1. The hydrokinetic torque coupling device 10 is operable to fluidly or mechanically couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14 and a torsional vibration damper (also referred to herein as a damper assembly) 16 are all rotatable about a rotational axis X. The drawings discussed herein show half-views, that is, the cross section of a portion or fragment of the hydrokinetic torque coupling device 10 above rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing shell 18 and a second casing shell 20 fixedly and sealingly connected together, such as by weld 19 at their outer peripheries, and non-movable relative to one another yet rotatable about the axis X. The first shell 18 is interconnected to and non-movable relative to the driving shaft, more typically a flywheel (not shown) that is fixed to and non-rotatable relative to the driving shaft, so that the casing 12 turns at the same speed that the engine operates. Specifically, in the illustrated embodiment of FIG. 1 the casing 12 is rotatably driven by the internal combustion engine and is non-rotatably coupled to the flywheel thereof with studs 21, shown in FIG. 1. Each of the first and second casing shells 18, 20 may be made, for example, integrally by press-forming one-piece metal sheets.

The first casing shell 18 includes a first sidewall portion 22 extending substantially radially relative to the direction from the rotational axis X (i.e., in a plane that is generally transverse to the rotational axis X) and a cylindrical first outer wall portion $26_1$ extending substantially axially from the first sidewall portion 22 toward the second casing shell 20. Similarly, the second casing shell 20 includes a second sidewall portion 24 extending substantially radially relative to the direction from the rotational axis X and a cylindrical second outer wall portion $26_2$ extending substantially axially from the second sidewall portion 24 toward the first casing shell 18. The first sidewall portion 22 includes a first engagement surface $22_1$, best shown in FIGS. 2 and 3. The first and second outer wall portions $26_1$, $26_2$ collectively establish an annular outer wall 26 substantially parallel with the rotation axis X. The weld 19 fixedly secures the outer wall portions $26_1$ and $26_2$ together. Although not shown, the casing 12 may include additional components, such as an annular cylindrical shell welded at opposite ends to and interconnecting the first and second outer wall portions $26_1$, $26_2$ together.

Figure 3:
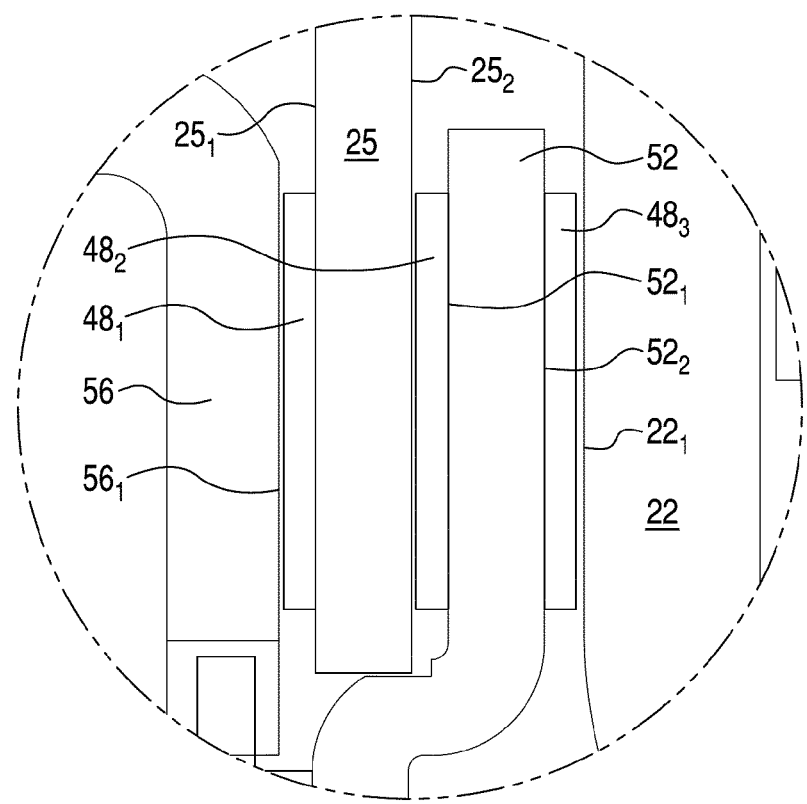
FIG. 3 is the same enlarged fragmentary view of circle 2 of FIG. 1, but with the first exemplary embodiment shown in the non-lockup mode.

Extending radially inward from the annular outer wall 26, more particularly from the outer wall portion $26_1$, is a clutch plate 25 having opposite clutch plate engagement surfaces $25_1$ and $25_2$. A spline connection may be used to connect the clutch plate 25 to the annular outer wall 26 so as to allow axial displacement of the clutch plate 25 relative to the casing 12, while securing the clutch plate 25 non-rotatably relative to the casing 12. As best shown in FIG. 3, a first frictional liner $48_1$ is secured to the clutch plate engagement surface $25_1$.

The torque converter 14 includes an impeller (sometimes referred to as the pump or impeller wheel) 30, a turbine-piston 32, and a stator (sometimes referred to as the reactor) 34 interposed axially between and operatively connecting the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydrodynamically) coupled to one another as known in the art.

The second casing shell 20 of the casing 12 also forms and serves as the impeller shell of the impeller 30. Accordingly, the impeller shell 20 sometimes is referred to as part of the casing 12. The impeller 30 further includes an impeller core ring 45, and a plurality of impeller blades 33 fixedly attached, such as by brazing, to the impeller core ring 45 and the impeller shell 20. The impeller 30, including its shell 20, the impeller core ring 45, and the impeller blades 33, is secured to the first casing shell 18 of the casing 12 so as to be non-rotatable relative to the casing 12 and hence interconnected to the drive shaft (or flywheel) of the engine to rotate at the same speed as the engine output. The impeller 30 also includes an impeller hub 31 fixedly secured to the impeller shell 20. The impeller hub 31 is arranged for engagement with a hydraulic pump of the transmission.

The turbine-piston 32 is a consolidation or incorporation of a turbine with a lockup clutch piston. The turbine component of the turbine-piston 32 includes a turbine-piston shell 35, a turbine-piston core ring 46, and a plurality of turbine-piston blades 36 fixedly attached, such as by brazing, to the turbine-piston core ring 46 and the turbine-piston shell 35. The spinning of the impeller 30 causes transmission fluid in the torus to spin the turbine blades 36, and hence the turbine-piston core ring 46 and the turbine-piston shell 35 in hydrodynamic transmission mode. The impeller shell 20 and the turbine-piston shell 35 collectively define a substantially toroidal inner chamber (or torus chamber) 53 therebetween.

The stator 34 is positioned between the impeller 30 and turbine-piston 32 to redirect fluid from the turbine-piston 32 back to the impeller 30 in an efficient manner. The stator 34 is typically mounted on a one-way clutch 72 to prevent the stator 34 from counter-rotation. A thrust bearing 74 is interposed between a side wall 73 of the stator 34 and the impeller shell 20 of the casing 12.

The hydrokinetic torque coupling device 10 further includes an output hub (also referred to as a hub) 40 that is rotatable about the rotational axis X. The output hub 40 is operatively coupled to and coaxial with the driven shaft. For example, the output hub 40 may be provided with internal splines 42 for non-rotatably coupling the output hub 40 to the driven shaft, such as a transmission input shaft, provided with complementary external splines or grooves. Alternatively, a weld or other connection may be used to fix the output hub 40 to the driven shaft. A radially outer surface of the output hub 40 includes an annular slot 43 for receiving a sealing member, such as an O-ring 44. A sealing member (not shown), mounted to a radially inner peripheral surface of the output hub 40, creates a seal at the interface of a transmission input shaft (not shown) and the output hub 40.

Extending axially at a radially inner peripheral end $35_2$ of the turbine-piston shell 35 is a substantially cylindrical flange 37 that is proximate to the rotational axis. The substantially cylindrical flange 37 of the turbine-piston 32 is rotatable relative to the output hub 40. The sealing member (e.g., O-ring) 44 creates a seal at the interface of the substantially cylindrical flange 37 and the output hub 40. As discussed in further detail below, the turbine-piston 32 is axially movably relative to the output hub 40 along this interface.

Figure 2:
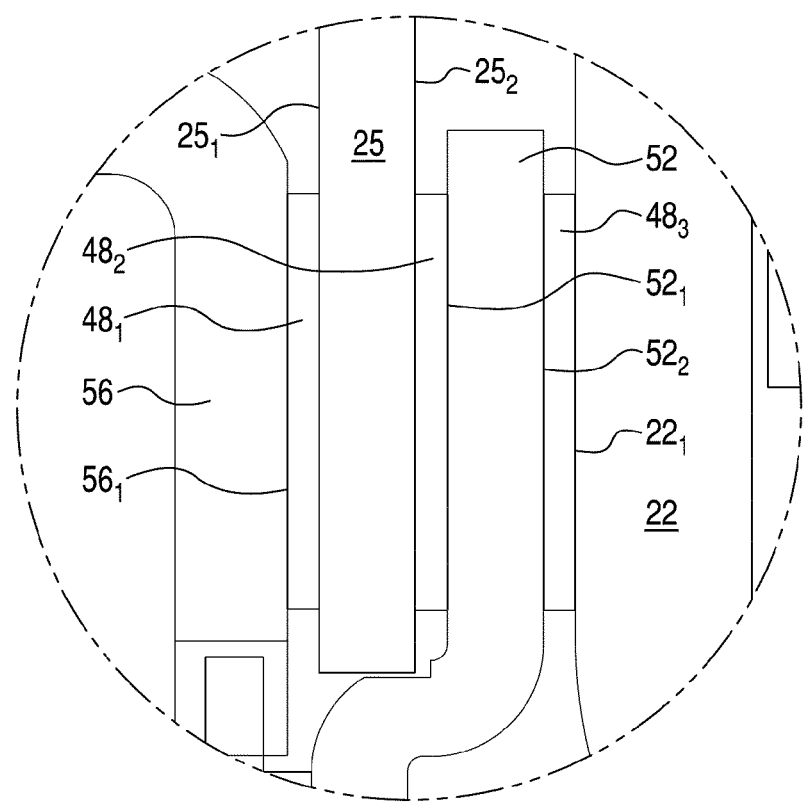
FIG. 2 is an enlarged fragmentary view of circle 2 of FIG. 1 in a lockup mode.

A drive component 56 is affixed to the turbine-piston shell 35, such as by an annular weld and/or fasteners 49 near a radially distal end $35_1$ of the turbine-piston shell 35. The drive component 56 includes an axially extending tubular portion 56a and a clutch portion 56b extending radially downward from the tubular portion 56a. Although the portions 56a, 56b are embodied as integral with one another, e.g., made of a single or unitary component, the portions 56a, 56b may be separate components connected together. As best shown in FIGS. 2 and 3, the clutch portion 56b of the drive component 56 has an engagement surface $56_1$ that faces and is parallel to engagement surface $25_1$ of the clutch plate 25.

The damper assembly 16 is housed in the casing 12 axially between the turbine-piston 32 and the first casing shell 18, as shown in FIG. 1. The damper assembly 16 includes first and second input disk parts 68, 69 connected to one another by rivet 70. The first input disk part 68 is operatively connected to the radially extending clutch portion 56b of the drive component 56 at connection 67 so that the drive component 56 rotationally drives the damper assembly 16. The connection 67 may be splined to allow the drive component 56 to be displaced axially relative to the damper assembly 16 by the turbine-piston 32 moving in and out of lockup mode, which is discussed in greater detail below.

The input disk parts 68, 69 are interconnected to a driven (or output) member 62 through a plurality of circumferentially extending elastic damping members 64. The driven member 62 has windows in which the elastic damping members 64 are set. The input disk parts 68, 69 engage first ends of the damping members 64, and the driven member 62 engages second ends of the second damping members 64. The disk parts 68, 69 are thus rotatable relative to the driven member 62, with the damping members 64 absorbing torsional vibration due to their elasticity. The damping members 64 are configured as helical (or coil) springs having principal axes oriented substantially circumferentially. Other elastic members may be selected to replace or supplement the springs.

As shown in FIG. 1, the output hub 40 and driven member 62 are integral with one another. Alternatively, the driven member 62 may be non-integrally connected to the output hub 40. The non-rotatable connection between the driven member 62 and the output hub 40 may be formed by splines or welding.

The hydrokinetic torque coupling device 10 includes an additional clutch plate 52 extending radially between the clutch plate 25 and the first sidewall portion 22. A radially inner end of the clutch plate 52 is connected to the damper assembly 16 by rivets 70, which also connect disk parts 68, 69. The clutch plate 52 is axially movable relative to the casing 12. This axial movement of the clutch plate 52 may be accomplished by several designs, such as providing sliding engagement between the damper assembly 16 and the output hub 40, providing sliding engagement between the output hub 40 and the driven shaft along splines 42, and/or configuring the damper assembly 16 to allow the damper retainer plates 68, 69 to move axially relative to the output plate 62. As best shown in FIGS. 2 and 3, the additional clutch plate 52 has a clutch plate engagement surface $52_1$ that faces and is parallel to the clutch plate engagement surface $25_2$ of the clutch plate 25, and another clutch plate engagement surface $52_2$ that faces and is parallel to the (first) engagement surface $22_1$ of the first sidewall portion 22.

The drive component 56 and clutch plates 25 and 52 collectively provide a multi-face lockup clutch 50. From left to right in the figures, the lockup clutch 50 includes engagement surface pairs $56_1$ and $25_1$, $25_2$ and $52_1$, and $52_2$ and $22_1$ that collectively establish a multi-interface lockup clutch 50. The engagement surfaces of each pair are movable towards and away from one another, e.g., $56_1$ and $25_1$ are movable towards each other into lockup mode and away from each other out of lockup mode, etc. One or more of the engagement surfaces $56_1$, $25_1$, $25_2$, $52_1$, $52_2$, and $22_1$ may be provided with a frictional ring (or friction lining) $48_1$, $48_2$, or $48_3$ (collectively referred to as 48). As best shown in FIG. 3, in the illustrated embodiment friction ring $48_1$ is secured to the clutch plate engagement surface $25_1$ and friction rings $48_2$ and $48_3$ are secured to the clutch plate engagement surfaces $52_1$, $52_2$, respectively. The friction rings 48 may be secured to the engagement surfaces, for example, by adhesive bonding and/or with fasteners. The friction rings 48 are made of a friction material for improved frictional performance. Friction rings 48 may be secured to any, all, or none of the engagement surfaces.

The turbine-piston 32 is axially displaceable to move the second engagement surface $56_1$ axially towards and away from the first engagement surface $22_1$ of the casing 12 for positioning the hydrokinetic torque coupling device 10 respectively into and out of a lockup mode in which the casing 12 is mechanically locked to the input part of the damper assembly 16. Axial displacement of the turbine-piston 32 into the lockup mode frictionally interlocks the clutch plate engagement surfaces $52_2$ and $25_1$ (including the friction ring(s) $48_3$ and $48_1$ secured thereto) to the first and second engagement surfaces $22_1$ and $56_1$, respectively, and frictionally interlocks the clutch plate engagement surfaces $25_2$ and $52_1$ to one another via friction rings $48_2$. Torque is transferred from the engine to the casing 12, then by way of the frictionally interlocked engagement surfaces (including the frictional linings 48 thereof) to the damping assembly 16 and the output hub 40. Notably, the friction rings $48_1$, $48_2$, and $48_3$ may have circumferentially spaced grooves (not shown) extending generally radially so as to fluidly connect the radially outer chamber 51 and the damper chamber 54 with one another in the lockup mode for cooling friction surfaces of the lockup clutch 50 by the working fluid.

The lockup clutch 50 bypasses the hydrodynamic fluid coupling of the torque converter 14 and mechanically non-rotatably couples the driving and driven shafts. The provision of multiple lockup interfaces between engagement surfaces increases torque capacity of the device 10.

Axial displacement of the turbine-piston 32 out of lockup mode releases the frictional interlocking of the engagement surfaces. In the non-lockup mode, normal operation of the torque converter 14 selectively fluidly (hydrodynamically) couples and decouples the impeller 30 to and from the turbine-piston 32.

As discussed above, the turbine-piston 32 is axially movable toward and away from the impeller shell 20 between a lockup position and a non-lockup (open) position. Axial movement of the turbine-piston 32 is accomplished by changing the pressure differential between the opposite sides of the turbine-piston shell 35. Referring to FIG. 1, a torus chamber 53 is to the left side of the turbine-piston shell 35, a damper chamber 54 is to the other (right) side of the turbine-piston shell 35, and a radially outer chamber 51 is located above (as shown in FIG. 1) or radially outside of the tubular portion 56a of the drive component 56 and the lockup clutch 52. In the illustrated embodiment of FIG. 1, the torus chamber 53 and the radially outer chamber 51 remain in fluid communication with one another, irrespective of whether the lockup clutch is in or out of lockup mode. A pressure increase in the torus chamber 53 relative to the damper chamber 54 (or stated differently a pressure decrease in the damper chamber 54 relative to the torus chamber 53) shifts the turbine-piston 32 axially against the direction of torque transmission, i.e., towards the input side of the casing 12, that is left to right in FIG. 1, into lockup mode. On the other hand, a pressure decrease in the torus chamber 53 relative to the damper chamber 54 (or stated differently a pressure increase in the damper chamber 54 relative to the torus chamber 53) shifts the turbine-piston 32 axially in the direction of torque transmission, i.e., towards the output side of the casing, that is right to left in FIG. 1, out of lockup mode. Pressure changes are created by control of the fluid, e.g., hydraulic fluid or oil, in the chambers 51, 53 and 54.

In operation, the lockup clutch 50 is generally activated after the hydrodynamic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be made somewhat thicker than typical turbine shells that do not form or function as the lockup piston. Although not shown, a biasing member, such as a spring, may be included in the hydrokinetic torque coupling device 10 to axially urge the turbine-piston 32 into or out of lockup mode.

The turbine-piston 32 both forms the shell component of the turbine and the piston component of the lockup clutch 50, as described above. By consolidating two components that are normally separate from one another into a single component, space is saved in the hydrokinetic torque coupling device 10. This space-saving structure provides several design options. For example, the hydrokinetic torque coupling device 10 can be made smaller and lighter. Alternatively, the free space within the casing 12 can be used to add additional components, such as damping components. Additionally, and as discussed in greater detail below, the drive component 56 simplifies assembly of the hydrokinetic torque coupling device 10.

An exemplary method for assembling the hydrokinetic torque coupling device 10 according to the embodiment of FIGS. 1 and 2 will now be explained. It should be understood that this exemplary method may be practiced in connection with the other embodiments described herein. This exemplary method is not the exclusive method for assembling the hydrokinetic torque coupling devices described herein. While the methods for assembling the hydrokinetic torque coupling device 10 may be practiced by sequentially performing the steps as set forth below, it should be understood that the methods may involve performing the steps in different sequences.

The impeller 30, the turbine-piston 32 (without the drive component 56), the stator 34, and the damper 16 may each be preassembled. The turbine-piston 32 includes, as noted above, the turbine-piston shell 35 and the turbine blades 36 attached to the turbine-piston shell 35. The drive component 56 and the clutch plates 25 and 52 may be, for example, stamped from metal.

The impeller 30, the stator 34, and the turbine-piston 32 subassemblies are assembled together. The drive member 56 is secured, such as by welding at the weld 49, to the turbine-piston shell 35. The damper assembly 16 is added. The cylindrical flange 37 of the turbine-piston 32 is mounted to slidingly engage the output hub 40 (splined with the driven shaft at 42) with the seal 44 therebetween. The clutch portion 56b of the drive component 56 is engaged at the spline connection 67 with the damper assembly 16 as described above. The first casing shell 18 with the clutch plate 25 pre-installed is fitted so that the clutch plates 25 and 52 and the clutch portion 56b of the drive component 56 are aligned as shown in FIG. 1. The first casing shell 18 is non-moveably and sealingly secured, such as by welding at 19, to the second casing shell 20, as best shown in FIG. 1.

Various modifications, changes, and alterations may be practiced with the above-described embodiment. The features of the embodiments described herein may be practice with one another and are substitutable in numerous combinations.

Figure 4:
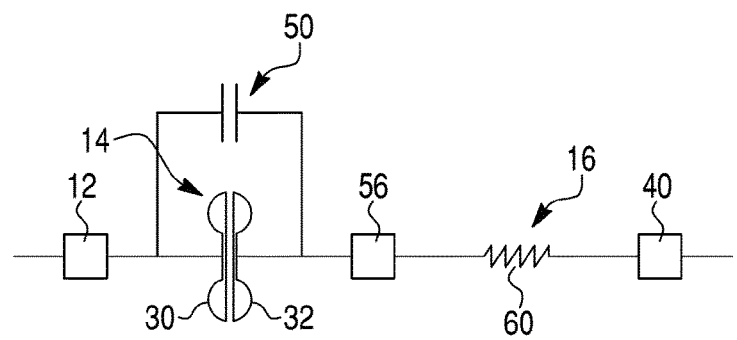
FIG. 4 is a simplified diagram of a hydrodynamic torque coupling device including a turbine-piston with a single damper assembly.

The torque converters and hydrodynamic torque coupling devices described herein may incorporate different damper assemblies. For example, FIG. 4 shows a hydrodynamic torque coupling devices including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60 of the damper assembly 16 and the output member 40 are arranged serially downstream of the turbine-piston shell 35 in FIG. 4. The diagram of FIG. 4 generally corresponds to the arrangement of the embodiment shown in FIGS. 1-3.

Figure 5:
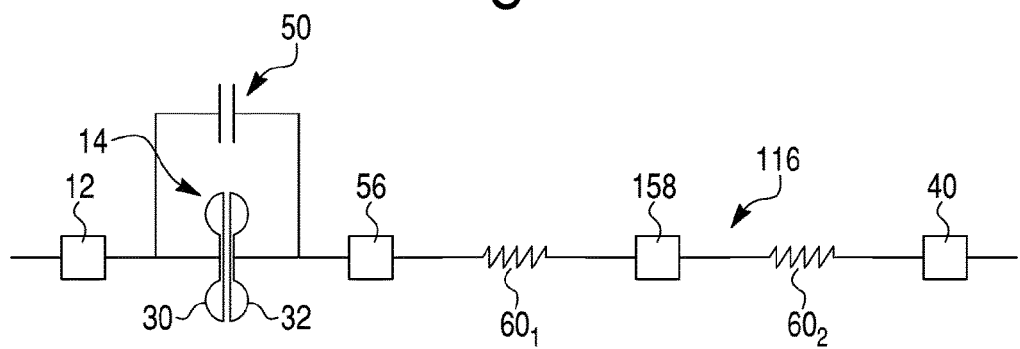
FIG. 5 is a simplified diagram of another hydrodynamic torque coupling device including a turbine-piston with a dual or double damper assembly.

FIG. 5 shows an alternative damper assembly 116 similar to that of FIG. 4, but in which the damper assembly 116 is modified to include the elastic damping members 60 as a first set of circumferentially extending elastic damping members $60_1$ and to further include a second set of circumferentially extending elastic damping members $60_2$ positioned radially inward of the first set of elastic damping members $60_1$. An intermediate member 158 is interposed serially between the first and second sets of elastic damping members $60_1$ and $60_2$ for absorbing torsional vibration. In turn, the second set of elastic damping members $60_2$ is interposed serially between the intermediate member 158 and the output member 40. The intermediate member 158 is rotatable relative to the drive component 56 via the elasticity of damping members $60_1$, and is rotatable relative to the output member 40 via the elasticity of damping members $60_2$.

Figure 6:
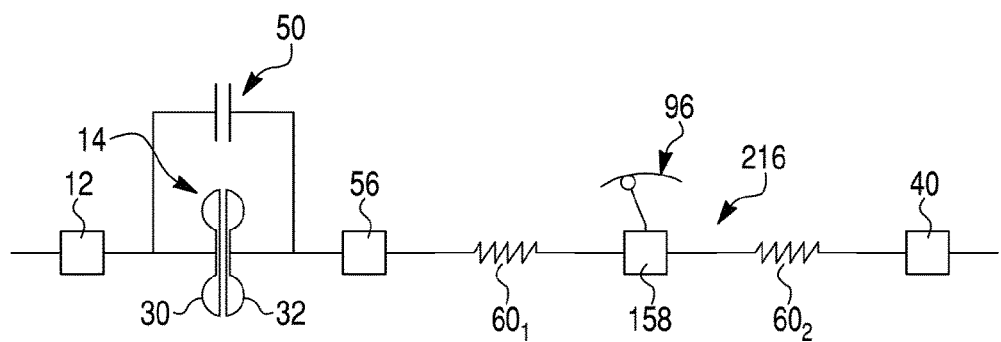
FIG. 6 is a simplified diagram of still another hydrodynamic torque coupling device including a turbine-piston with dual or double damper assemblies and a pendulum vibration absorber.

A damper assembly 216 shown in FIG. 6 is similar to that of FIG. 5, but further includes pendulum vibration absorbers 96 coupled to an intermediate member 158. Pendulum vibration absorbers 96 are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The pendulum vibration absorbers 96 may be coupled to the circumference of the intermediate member 158 and may be arranged on both sides of the intermediate member 158.

Figure 7:
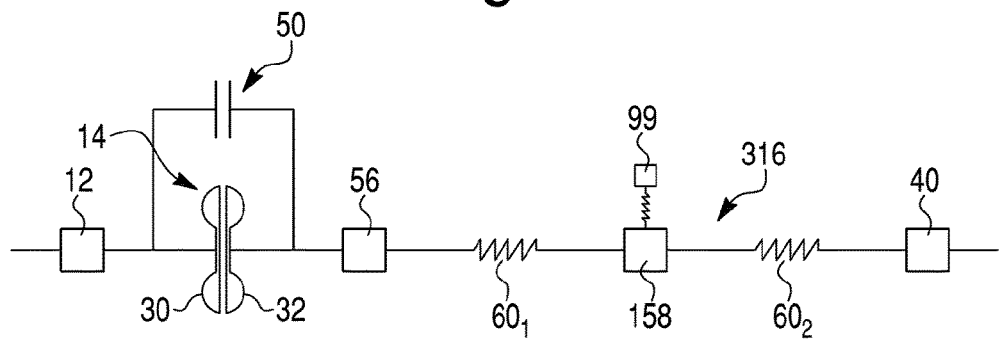
FIG. 7 is a simplified diagram of a further hydrodynamic torque coupling device including a turbine-piston with dual or double damper assemblies and a vibration absorbing spring-mass system.

A damper assembly 316 shown in FIG. 7 is similar to that of FIG. 5, but further includes a spring mass system 99 coupled to an intermediate member 158. Spring-mass systems are well known in the art and described in, for example, WO 2004/018897 to Haller. The spring-mass system 99 may be coupled to the circumference of the intermediate member 158. The spring of the spring-mass system 99 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable in numerous combinations.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling a driving shaft and a driven shaft together, comprising:
   an impeller comprising an impeller shell;
   a casing comprising a casing shell connected to the impeller shell, the casing having a first engagement surface;
   an axially displaceable turbine-piston coaxially aligned with and hydrodynamically drivable by the impeller, the turbine-piston comprising a turbine-piston shell and a drive component having a second engagement surface;
   a damper assembly comprising an input part drivingly interconnected to the turbine-piston and an output part operatively connectable to an output hub; and
   a clutch plate non-rotatably connected to and axially displaceable relative to the casing, the clutch plate having opposite clutch plate engagement surfaces interposed between and axially movable relative to at least one of the first and second engagement surfaces,
   wherein the turbine-piston is axially displaceable relative to the casing to move the second engagement surface axially towards and away from the first engagement surface for positioning the hydrokinetic torque coupling device into and out of a lockup mode in which the first and second engagement surfaces and the clutch plate engagement surfaces frictionally interlock with one another so that the casing is mechanically locked to and non-rotatable relative to the input part of the damper assembly,
   wherein the input part of the damper assembly is non-rotatably and axially movably connected to the drive component.

2. The hydrokinetic torque coupling device of claim 1, further comprising an additional clutch plate non-rotatably connected to the damper assembly and axially displaceable relative to the casing.

3. The hydrokinetic torque coupling device of claim 1, wherein:

the input part of the damper assembly is non-rotatably and axially movably connected to the drive component; and
the hydrokinetic torque coupling device further comprises an additional clutch plate non-rotatably connected to the damper assembly and axially displaceable relative to the casing.

4. The hydrokinetic torque coupling device of claim 3, wherein the clutch plate is interposed between the drive component and the additional clutch plate, and wherein the additional clutch plate is interposed between the clutch plate and the first engagement surface of the casing.

5. The hydrokinetic torque coupling device of claim 3, wherein the drive component and the clutch plate are rotatable relative to one another when the hydrokinetic torque coupling device is out of the lockup mode.

6. The hydrokinetic torque coupling device of claim 3, wherein one of the clutch plate engagement surfaces of the clutch plate comprises a first frictional lining, and wherein one of the clutch plate engagement surfaces of the additional clutch plate comprises a second frictional lining.

7. The hydrokinetic torque coupling device of claim 3, wherein one of the clutch plate engagement surfaces of the clutch plate comprises a first frictional lining, and wherein the opposite clutch plate engagement surfaces of the additional clutch plate comprise second and third frictional linings, respectively.

8. The hydrokinetic torque coupling device of claim 1, wherein the drive component of the turbine piston comprises an axially extending tubular portion fixed to the turbine-piston shell and a radially extending clutch portion having the second engagement surface.

9. The hydrokinetic torque coupling device of claim 8, wherein the turbine-piston comprises a plurality of turbine blades, and wherein the axially extending tubular portion of the drive component is radially outside of the turbine blades.

10. The hydrokinetic torque coupling device of claim 8, wherein the axially extending tubular portion and the radially extending clutch portion of the drive component are integral with one another.

11. The hydrokinetic torque coupling device of claim 1, wherein the first and second engagement surfaces and the clutch plate engagement surfaces extend radially at an angle of about 90 degrees relative to a rotational axis of the casing.

12. The hydrokinetic torque coupling device of claim 1, wherein the casing shell forms the first engagement surface of the casing.

13. The hydrokinetic torque coupling device of claim 1, wherein the turbine-piston is axially displaceable towards an input side of the hydrokinetic torque coupling device in order to frictionally couple the clutch plate engagement surfaces and the first and second engagement surfaces together and position the hydrokinetic torque coupling device in the lockup mode, and wherein the turbine-piston is axially movable towards an output side of the hydrokinetic torque coupling device so that the first and second engagement surfaces are not frictionally coupled and the hydrokinetic torque coupling device is not in the lockup mode.

14. The hydrokinetic torque coupling device of claim 1, further comprising a stator situated between the impeller and the turbine-piston.

15. The hydrokinetic torque coupling device of claim 12, wherein the damper assembly comprises an intermediate member, a first set of circumferentially extending elastic damping members drivingly coupling the input part to the intermediate member, the output part connected to and non-rotatable relative to the output hub, a second set of circumferentially extending elastic damping members drivingly coupling the intermediate member to the output part, and a centrifugal pendulum oscillator mounted to the intermediate member.

16. The hydrokinetic torque coupling device of claim 12, wherein the damper assembly comprises an intermediate member, a first set of circumferentially extending elastic damping members drivingly coupling the input part to the intermediate member, the output part connected to and non-rotatable relative to the output hub, a second set of circumferentially extending elastic damping members drivingly coupling the intermediate member to the output part, and a spring mass system coupled to the intermediate member.

17. A method of assembling a hydrokinetic torque coupling device for coupling a driving shaft and a driven shaft together, comprising:
providing a torque converter comprising an impeller including an impeller shell, and an axially displaceable turbine-piston including a turbine-piston shell and a drive component; and
operatively connecting the torque converter to a casing shell, a damper assembly comprising an input part drivingly interconnected to the turbine-piston and an output part operatively connectable to an output hub, wherein the input part is non-rotatably and axially movably connected to the drive component, and a clutch plate having opposite clutch plate engagement surfaces to assemble the hydrokinetic torque coupling device comprising a casing including the casing shell, wherein the clutch plate is non-rotatably connected to and axially displaceable relative to the casing and interposed between and axially movable relative to at least one of a first engagement surface of the casing and a second engagement surface of the drive component, wherein the turbine-piston is axially displaceable relative to the casing to move the second engagement surface axially towards and away from the first engagement surface for positioning the hydrokinetic torque coupling device into and out of a lockup mode in which the first and second engagement surfaces and the clutch plate engagement surfaces frictionally interlock with one another so that the casing is mechanically locked to and non-rotatable relative to the input part of the damper assembly.

18. A method of operating a hydrokinetic torque coupling device comprising an impeller including an impeller shell, a casing having a first engagement surface and including a casing shell connected to the impeller shell, an axially displaceable turbine-piston coaxially aligned with and hydrodynamically drivable by the impeller and including a turbine-piston shell and a drive component having a second engagement surface, a damper assembly comprising an input part drivingly interconnected to the turbine-piston and an output part operatively connectable to an output hub, wherein the input part is non-rotatably and axially movably connected to the drive component, and a clutch plate non-rotatably connected to and axially displaceable relative to the casing and having opposite clutch plate engagement surfaces interposed between and axially movable relative to at least one of the first and second engagement surfaces, said method comprising:
axially displacing the turbine-piston relative to the casing to move the second engagement surface axially towards and away from the first engagement surface for positioning the hydrokinetic torque coupling device into and out of a lockup mode in which the first and second engagement surfaces and the clutch plate engagement surfaces frictionally interlock with one another so that the casing is mechanically locked to and non-rotatable relative to the input part of the damper assembly.

\* \* \* \* \*